Figure 1:
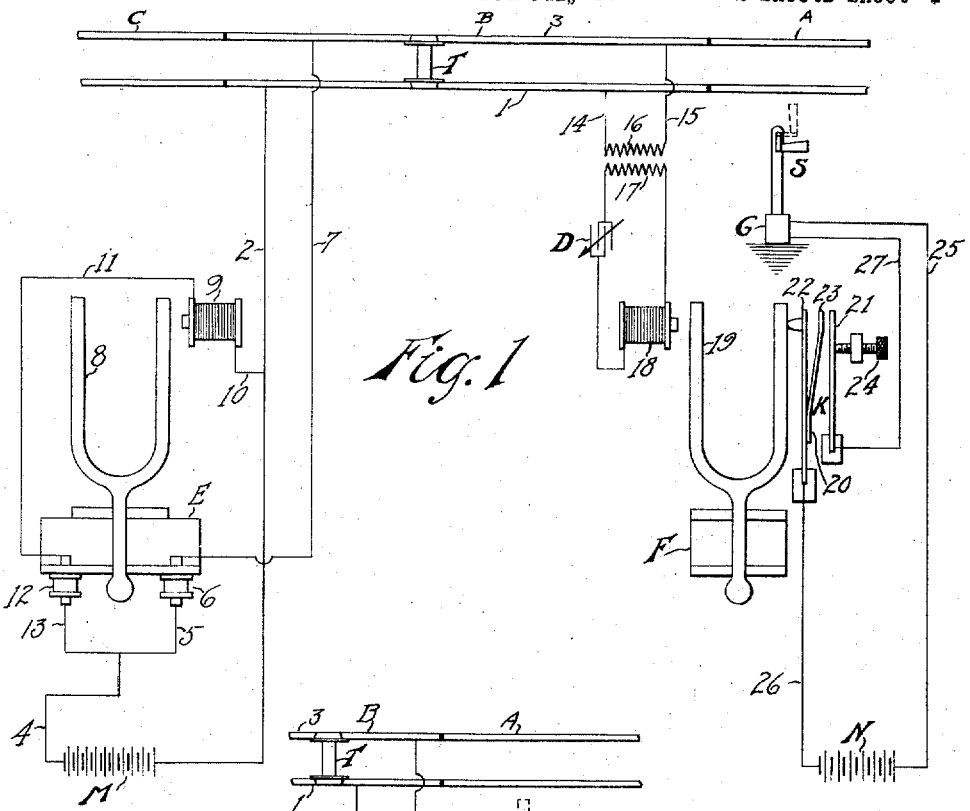

March 13, 1928. Re. 16,901

N. H. HOLLAND

ELECTRIC SYSTEM

Original Filed July 13, 1920 2 Sheets-Sheet 1

INVENTOR
Newman H. Holland
BY Henry Lanahan
ATTORNEY

March 13, 1928. Re. 16,901

N. H. HOLLAND

ELECTRIC SYSTEM

Original Filed July 13, 1920 2 Sheets-Sheet 2

INVENTOR
Newman H. Holland
BY Henry Lanahan
ATTORNEY

Reissued Mar. 13, 1928. Re. 16,901

UNITED STATES PATENT OFFICE.

NEWMAN H. HOLLAND, OF MONTCLAIR, NEW JERSEY, ASSIGNOR, BY MESNE ASSIGNMENTS, TO THOMAS A. EDISON, INCORPORATED, OF WEST ORANGE, NEW JERSEY, A CORPORATION OF NEW JERSEY.

ELECTRIC SYSTEM.

Original No. 1,498,238, dated June 17, 1924, Serial No. 395,897, filed July 13, 1920. Application for reissue filed June 11, 1926. Serial No. 115,353.

My invention relates to electric systems and more particularly to signaling systems such as automatic railway block or other railway signaling systems and control systems wherein track circuits or other circuits containing or associated with relays or other control devices are employed to control signal circuits or signal-control circuits or other circuits; the present invention in some aspects being an improvement on the invention disclosed in Patent No. 1,405,005, entitled Signaling systems and granted January 31, 1922, on an application of Isaac P. Rodman.

In practically all signaling on control systems of this character now in use, the track or other control circuits are supplied either with direct current from primary or storage batteries, or with alternating current of given frequencies fed thereto from high voltage transmission lines by transformers. Where in a railway signaling system, direct-current track control circuits are used, there is more or less danger of failure of operation of the signal for a given block or track section, by reason of the entrance of stray currents into the corresponding track circuit from outside sources, such, for example, as an adjacent track circuit. Where alternating-current track or control circuits are employed, the same are, of course, immune to stray direct currents, but are likely to be seriously affected by stray alternating currents coming from sources wholly outside the system. This is due to the fact that the great majority of alternating-current circuits now used are supplied with commercial alternating currents at certain frequencies and alternating currents of the same frequencies are often used in alternating-current signaling or control systems. Moreover, the present-day types of alternating-current signaling or control systems are of high initial cost and comparatively complex due to the necessity of using large central power houses usually provided with alternating-current generating apparatus in duplicate, substantially constructed high power transmission lines, transformers, impedance bonds, polarized circuits, line-control circuits, etc.

One of the principal objects of my invention is to provide an improved, and an extremely simple and efficient signaling or control system which has all the advantages of present-day alternating current railway signaling or control systems as regards interference by stray or foreign direct currents, which will be unaffected by stray currents from alternating-current circuits supplied with commercial alternating currents, and wherein its unnecessary to employ polarized circuits, or line-control circuits, or a transmission line for supplying current to the different track or other control circuits.

Another and also one of the principal objects of my invention is to provide a signaling or control system of this character wherein current variations such as direct-current pulsations or alternating currents are produced in the track circuits or the circuits containing or associated with the relays or other devices for controlling the signal circuits or signal-control or other circuits by means comprising a novel type of pulsating-current generator and suitable sources of direct current such as primary or storage batteries.

A further object of my invention resides in a novel form of relay especially adapted for use in my improved system.

In my copending application, Serial No. 712,180, filed May 10, 1924, entitled Signaling systems or the like, and a division of the application for the said Patent No. 1,498,238, sought to be reissued by the present application, I have described and claimed the novel forms of pulsating-current generator and relay referred to above.

More specifically described, my invention as applied to a railway signaling system, consists in producing in each track circuit of such a system, by the use of sources of direct current such as primary or storage batteries, current variations such as direct-current pulsations or alternating current, of a given frequency and preferably different from the frequency of the current variations produced in any adjacent track circuit, and associating with each track circuit a relay or other control device for controlling the corresponding signal or signal-control circuit and which is tuned to the frequency of the current variations produced in such track circuit. I preferably employ as the means for producing current variations in each track circuit, a direct-current circuit supplied with current from a primary battery or other suitable source and containing a resistance means such as a microphone, the resistance of which is variable by vibration, and a vibratory means such as a reed and preferably a tuning fork positioned so as to affect such resistance means by its vibration whereby direct-current pulsations of a definite period or frequency corresponding to the natural period of vibration of said reed will be produced in such direct-current circuit. The relay or other control device for controlling the corresponding signal circuit is tuned either mechanically or electrically or both mechanically and electrically, preferably the latter, to the frequency of the current variations thus produced in the track circuit, and the arrangement is preferably such that the frequency of the direct-current pulsations or the alternating current thus applied to each track circuit is different from that supplied to any adjacent track circuit and preferably also different from the frequencies of any stray currents such as the commercial alternating currents usually employed for the propulsion of trains on railroads or other purposes.

Other features and objects of my invention will be hereinafter more fully described and claimed.

Figure 2:
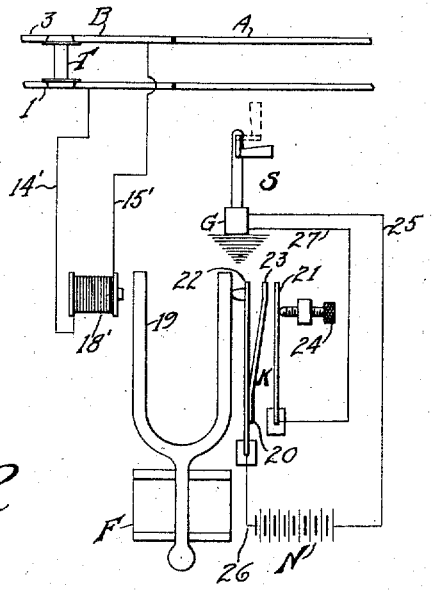
Figure 3:
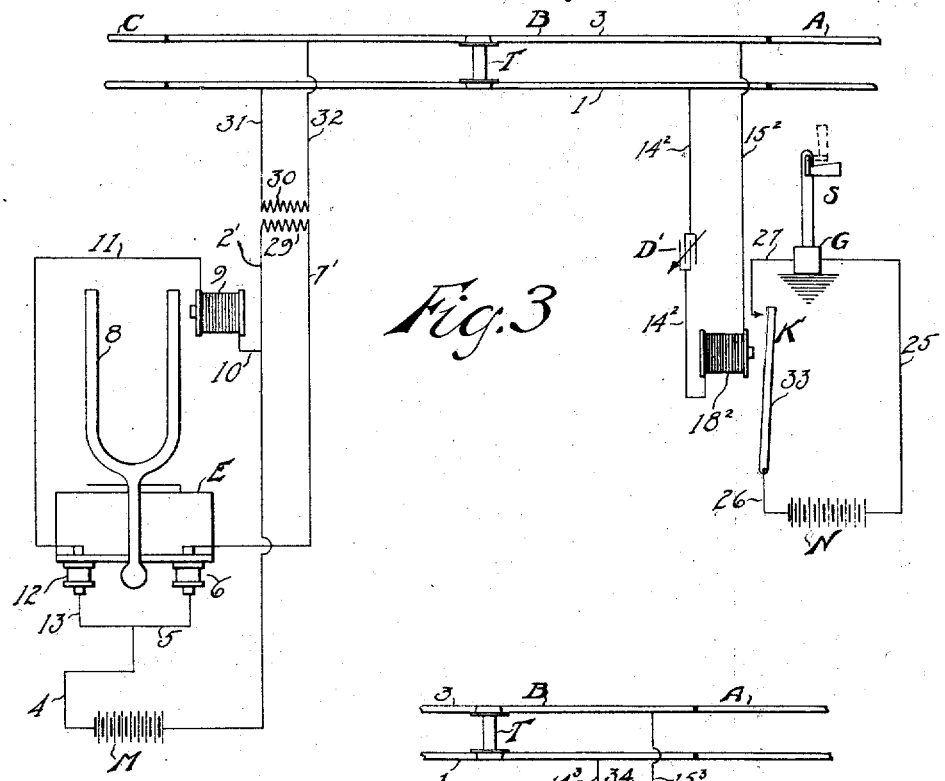
Figure 4:
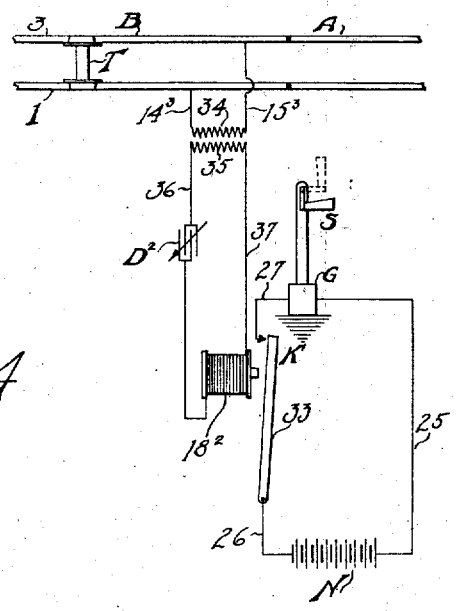

In order that my invention may be more clearly understood, attention is directed to the drawings accompanying and forming a part of this specification, and in which:

Figure 1 is a diagrammatic view illustrating a portion of one form of an automatic railway block signaling system in accordance with my invention, in which the current variations produced in the track circuits associated with the relays for controlling the signal or signal-control circuits are direct-current pulsations, and in which the circuits containing or associated with the relays have produced therein alternating currents of frequencies respectively corresponding to the frequencies of the direct-current pulsations in the track circuits, the relays in this case being both mechanically and electrically tuned;

Fig. 2 is a diagrammatic view illustrating a modification of the system shown in Fig. 1, in which the relays for controlling the signal or signal-control circuits are only mechanically tuned and are included in the track circuits, and in which the current variations produced in the latter circuits are direct-current pulsations;

Fig. 3 is a view similar to Fig. 1, showing another form of signaling system in accordance with my invention, in which the track circuits are supplied with alternating currents and in which the relays for controlling the signal or signal-control circuits are electrically tuned to the frequencies of the said alternating currents in the track circuits; and Fig. 4 is a view illustrating a slight modification of the system shown in Fig. 3.

Referring to the drawings and especially to Fig. 1, reference characters A, B and C represent three track sections or blocks of a railway signaling system in accordance with my invention, and S the signal associated with and disposed at the entrance of the section or block B for governing the same; it being understood that similar signals are disposed at the entrance of all other blocks of the system. Reference character M represents a primary battery one side of which is connected to one rail 1 of the section B at the exit end thereof by means of conductor 2, and the other side of which is connected to the rail 3 of section B at the exit end thereof through conductor 4, conductor 5, microphone 6 and conductor 7. The microphone 6 is mounted on a suitable support E on which is also mounted a vibratory reed such as a tuning fork 8. An electro-magnet 9 is disposed adjacent one leg of the tuning fork 8, and one end of the coil of this electro-magnet is connected to one side of the battery M through conductors 10 and 2, while the other end of said coil is connected to the other side of the battery M through conductor 11, microphone 12 and conductors 13 and 4. The microphone 12 is also mounted on the support E and it will accordingly be apparent that both of the microphones 6 and 12 will be affected by vibrations of the tuning fork. At the entrance end of the section or block B, the rails 1 and 3 are respectively connected by means of conductors 14 and 15 to the primary 16 of a transformer, the secondary 17 of the transformer being connected in circuit with the electro-magnet 18 of a relay. The armature of the relay consists of a vibratory reed, preferably a tuning fork 19, mounted on a suitable support F and having the same natural period of vibration as the tuning fork 8. This tuning fork 19 controls a switch K which is located in a circuit to be controlled such as the signal or signal-control circuit for signal S and which comprises two spring contacts 20 and 21 fixed at one end. The spring contact 20 comprises two arms 22 and 23, and normally assumes a position with its arm 22 engaging one leg of the tuning fork 19 and with its arm 23 in opposed spaced relation at its upper end to the upper end of the spring contact 21. Suitable means is provided for effecting a relative adjustment of the contacts 20 and 21, this means as shown consisting of a screw 24 threaded through a suitable support and coacting with the contact 21 to effect adjustment of the upper end of the latter towards and away from the upper end of the arm 23 of the contact 20. Reference character N represents a suitable source of current such as a primary or storage battery for supplying current to the circuit to be controlled, such as the signal or signal-control circuit for signal S, one side of the battery being connected to the motor, (not shown) disposed in the casing G, for actuating the signal S, by means of conductor 25, and the other side thereof being connected to contact 20 of switch K by conductor 26. The signal actuating motor in casing G is also connected to switch contact 21 by means of conductor 27. When the signal or signal-control circuit is opened, the signal actuating motor in casing G will, of course, cease to operate and the signal S will thereupon, under the action of gravity, drop to "danger" position as shown; but when this circuit is closed, the motor will move the signal S to and hold the same in "clear" position as indicated in dotted line.

The operation of that form of my invention shown in Fig. 1 is as follows: Direct current is continuously supplied to the track circuit section B over the following path: From battery M through conductor 2, rail 1, and conductor 14 to the primary 16 of the transformer, then through conductor 15, rail 3, conductor 7, microphone 6, conductor 5 and conductor 4 back to the battery. Direct current will also be continuously supplied to a second circuit over the following path: From the battery M through conductor 2, conductor 10, the coil of electro-magnet 9, conductor 11, microphone 12, conductor 13 and conductor 4 back to the battery. This second circuit together with the tuning fork 8 disposed in operative relation to the electro-magnet 9 comprise a pulsating current generator, for when this circuit is made, the electro-magnet 9 attracts the tuning fork 8 and starts the same vibrating in its natural period, the tuning fork 8 in vibrating, vibrates the support E and microphone 12, thereby producing changes or variations in the resistance of the microphone 12 corresponding in frequency to the vibrations of the tuning fork which in turn effects current variations or pulsations in the circuit including the coil of electro-magnet 9. It is therefore apparent that the tuning fork will be continuously vibrated in its natural period as long as said circuit is closed and supplied with current. The vibrations of the tuning fork 8 also effect variations of the same frequency in the resistance of the microphone 6, and accordingly direct-current pulsations of a frequency corresponding to the frequency of the natural period of vibration of the tuning fork 8 are produced in the track circuit including the primary 16 of the transformer. Of course, it is not necessary to connect the electro-magnet 9 and microphone 12 in shunt with the track circuit as shown, for the same results may be obtained by using a single microphone and connecting the same and the electro-magnet in series with the track circuit. Obviously alternating current of a frequency corresponding to the frequency of the direct-current pulsations in the track circuit, will be produced in the circuit of the secondary 17 of the transformer and the electro-magnet 18 of the relay controlling the signal or signal-control circuit. The relay is suitably electrically tuned to the frequency of the alternating current thus produced in the circuit of the secondary 17 of the transformer and the electro-magnet 18, and, therefore, to the frequency of the direct-current pulsations in the track circuit and to the natural period of vibration of tuning fork 8, as by means of an adjustable condenser D in the circuit of the secondary 17. The tuning fork 19 comprising the armature of the relay, being of the same natural period of vibration as the tuning fork 8, the relay is also mechanically tuned to the frequency of the alternating current in the circuit of the electro-magnet 18 and secondary 17 of the transformer and, therefore, to the frequency of the direct-current pulsations produced in the track circuit by the pulsating-current generator. The tuning fork 19 will, therefore, assuming the section or block B to be unoccupied, be vibrated in its natural period and, by reason of the engagement of one leg thereof with the arm 22 of the spring contact 20, will normally maintain the latter in circuit closing position with the arm 23 thereof in engagement with the spring contact 21. In this connection it is to be noted that the spring contact 20 should have a natural period of vibration different from and preferably much less than the natural period of vibration of the tuning fork 19. Switch K thus being maintained closed, current will be supplied to the signal actuating motor and the signal S will be normally held in "clear" position as explained above. When a train T moves into the section or block B, as shown, the primary 16 of the transformer will be short-circuited and accordingly the electro-magnet 18 of the relay will be de-energized. The tuning fork 19 will thereupon cease to vibrate, the spring contact 20 of switch K will move to and remain in open position, the motor in casing G will cease to operate and the signal S will, under the action of gravity, drop to "danger" position, as shown. When the train T moves out of the section or block B, the relay controlling the signal or signal-control circuit will again be operated as above described, said circuit will be closed and the signal returned to "clear" position.

In the modified system shown in Fig. 2, the rails 1 and 3 of section or block B, are directly connected at the entrance end of the section by means of conductors 14′ and 15′, respectively corresponding to the conductors 14 and 15 shown in Fig. 1, to the coil of the electro-magnet 18′ of the relay for controlling the signal or signal-control circuit instead of to the primary of a transformer. Accordingly, direct-current pulsations of a frequency corresponding to the frequency of the tuning fork of the pulsating-current generator are produced in the circuit of the coil of the electro-magnet 18′. Therefore, in this form of my invention, the relay of which the electro-magnet 18′ is a part, is tuned to the direct-current pulsations produced by the pulsating-current generator only by reason of the fact that the tuning fork 19 comprising the armature of the relay has the same natural period of vibration as the tuning fork of such generator. It will be apparent that when the section B is unoccupied, the electro-magnet 18′ will be supplied with direct-current pulsations and effect the vibration of the tuning fork 19 in its natural period. Except as just described, the construction, arrangement and operation of this form of my invention and that shown in Fig. 1 are the same.

In the modification shown in Fig. 3, the conductors 2′ and 7′, respectively corresponding to the conductors 2 and 7 of the system shown in Fig. 1, instead of being respectively connected to the rails 1 and 3 of section B, are connected to the primary 29 of a transformer. The secondary 30 of this transformer is connected by conductors 31 and 32 across the rails 1 and 3 of the section B at the exit end thereof, and said rails are respectively connected at the entrance end of the section B by means of conductors $14^2$ and $15^2$ to the terminals of the coil of the electro-magnet $18^2$ comprising a part of the relay for controlling the signal or signal-control circuit for signal S. The armature of the relay consists of a pivoted arm 33 constituting a part of a switch K′ in the signal or signal-control circuit. In this form of my invention the track circuit is as follows: From one terminal of the secondary 30 through conductor 31, rail 1, conductor $14^2$, the coil of electro-magnet $18^2$, conductor $15^2$, rail 3 and conductor 32, to the other terminal of the secondary 30. It will be apparent that direct-current pulsations of a frequency corresponding to the frequency of the vibrations of the tuning fork 8 will be produced in the circuit of the primary 29 of the transformer, such circuit being as follows: From the battery M through conductor 2′, primary 29, conductor 7′, microphone 6, conductor 5 and conductor 4 back to the battery. Alternating current of a frequency corresponding to the frequency of the direct-current pulsations in the circuit of the primary 29 will therefore be produced in the track circuit including the secondary 30 of the transformer, and when the section or block B is unoccupied, the electro-magnet $18^2$ will be energized, for the latter is suitably electrically tuned, as by means of the adjustable condenser D′, to alternating current of such frequency. The armature 33 will thereupon be moved to a position closing the signal or signal-control circuit for signal S and the latter will accordingly be moved to "clear" position. When a train T enters the section or block B, the electro-magnet $18^2$ will be short-circuited, whereupon the armature 33 will automatically move to a position opening the signal or signal-control circuit, and the signal will move to "danger" position, as shown.

In that form of my invention illustrated in Fig. 4, the conductors $14^3$ and $15^3$ respectively corresponding to the conductors $14^2$ and $15^2$ of the system shown in Fig. 3, instead of being directly connected to the coil of the electro-magnet $18^2$ of the relay controlling the signal or signal-control circuit, are connected to the primary 34 of a transformer. The secondary 35 of this transformer is connected by conductors 36 and 37 to the terminals of the coil of the electro-magnet $18^2$ of the relay. Suitable means, such as an adjustable condenser $D^2$, is connected in circuit with the coil of the electro-magnet for the purpose of electrically tuning the relay to the frequency of the alternating currents produced in the circuit of said coil and in the track circuit, and therefore to the frequency of the direct-current pulsations produced in the circuit of the primary 29 as well as to the frequency of the vibrations of the tuning fork 8 of the pulsating-current generator. The purpose of the transformer comprising the primary 34 and secondary 35 is merely to enable the voltage of the alternating current produced in the circuit of the electro-magnet $18^2$ to be stepped up or down as desired with respect to the voltage of the alternating current produced in the track circuit. Except as just described, the construction, arrangement and operation of this form of my invention and that shown in Fig. 3 are the same.

While with respect to each form of the invention disclosed herein, I have shown and described the circuit connections for only one track section or block, it is to be understood that similar circuit connections operating in a similar manner, are provided for all other sections or blocks. The arrangement is preferably such, however, that the pulsating-current generator associated with any section produces current pulsations of a frequency different from that of the current pulsations produced by the pulsating-current generator associated with any adjacent section or block, whereby there will be no danger of the relay for any section being affected by stray currents from the circuit connections of any adjacent section.

While I have shown several embodiments of my invention, it is to be understood that these are for the purposes of illustration only and that such embodiments are subject to numerous changes and modifications without departure from the spirit of the invention and the scope of the appended claims. It is also to be understood that while I have shown and specifically described my invention as applied to railway signaling systems, it is equally well adapted, as to its principal features at least, for application to various other electric systems including automatic train-control systems.

Having now described my invention, what I claim as new and desire to protect by Letters Patent of the United States, is as follows:

1. In an automatic railway block signaling system, a direct-current circuit which is constantly closed during operation of the system, means comprising a vibratory reed which is extraneous to all circuits of the system for producing current pulsations of a given frequency in the direct-current circuit, a signal circuit, and means for controlling said signal circuit comprising a device normally in operative relation to said direct-current circuit and tuned to the frequency of the current pulsations in the latter, the presence of a train in a block with which said signal circuit is associated, placing said device in inoperative relation to said direct-current circuit, substantially as described.

2. In an automatic railway block signaling system, a signal circuit, and means for controlling said signal circuit, comprising a direct-current circuit which is constantly closed during operation of the system, means comprising a vibratory reed which is extraneous to all circuits of the system for producing current pulsations of a given frequency in said direct-current circuit, and a relay normally in operative relation to said direct-current circuit and tuned to the frequency of the current pulsations in the latter for controlling the signal circuit, the presence of a train in a block with which the signal circuit is associated, placing said relay in inoperative relation to said direct-current circuit, substantially as described.

3. In an automatic railway block signaling system, a signal circuit, a direct-current circuit which is constantly closed during operation of the system, means comprising a vibratory reed which is extraneous to all circuits of the system for producing current pulsations of a given frequency in said direct-current circuit, the track section of the block with which said signal circuit is associated being electrically associated with said direct-current circuit whereby current variations of a frequency corresponding to the frequency of the pulsations in the direct-current circuit are produced in said track section, and a relay tuned to the frequency of the current variations produced in the track section for controlling the signal circuit, said relay being electrically associated with said track section so as to be normally responsive to the current variations produced in the latter, the presence of a train in said track section rendering said relay unresponsive to the said current variations, substantially as described.

4. In an automatic raliway block signaling system, a signal circuit for each of a plurality of blocks, and means for controlling each signal circuit comprising a direct-current circuit which is constantly closed during operation of the system, means comprising a vibratory reed which is extraneous to all circuits of the system for producing current pulsations of a given frequency in said direct-current circuit, and a relay normally in operative relation to said direct-current circuit and tuned to the frequency of the current pulsations in the latter, the presence of a train in a corresponding block placing said relay in inoperative relation to said direct-current circuit, the frequency of the current pulsations produced in the said direct-current circuit for any given block being different from that of the current pulsations produced in the direct-current circuit for any adjacent block, substantially as described.

5. In an automatic railway block signaling system, a direct-current circuit which is constantly closed during operation of the system, means comprising a vibratory reed which is extraneous to all circuits of the system for producing current pulsations of a given frequency in the direct-current circuit, a signal circuit, and means for controlling said signal circuit comprising a device normally in operative relation to said direct-current circuit and mechanically tuned to the frequency of the current pulsations in the latter, the presence of a train in a block with which said signal circuit is associated, placing said device in inoperative relation to said direct-current circuit, substantially as described.

6. In an automatic railway block signaling system, a direct-current circuit which is constantly closed during operation of the system, means comprising a vibratory reed which is extraneous to all circuits of the system for producing current pulsations of a given frequency in the direct-current circuit, a signal circuit, and means for controlling said signal circuit comprising a device normally in operative relation to said direct-current circuit and mechanically and electrically tuned to the frequency of the current pulsations in the latter, the presence of a train in a block with which said signal circuit is associated, placing said device in inoperative relation to said direct-current circuit, substantially as described.

7. In an automatic railway block signaling system, a signal circuit for each of a plurality of blocks, and means for controlling each signal circuit comprising a direct-current circuit which is constantly closed during operation of the system, means comprising a vibratory reed which is extraneous to all circuits of the system for producing current pulsations of a given frequency in said direct-current circuit, and a relay which is normally in operative relation to said direct current circuit and which comprises a reed tuned to the frequency of said current pulsations, the presence of a train in the corresponding block placing said relay in inoperative relation to said direct-current circuit, substantially as described.

8. In an automatic railway block signaling system, a direct-current circuit which is constantly closed during operation of the system, means comprising a vibratory reed which is extraneous to all circuits of the system for producing current pulsations of a given frequency in the direct-current circuit, a signal circuit, and means normally in operative relation to said direct current circuit for controlling said signal circuit and comprising a reed tuned to the frequency of said current pulsations, the presence of a train in a block with which said signal circuit is associated, placing said controlling means in inoperative relation to said direct-current circuit, substantially as described.

9. In an automatic railway block signaling system, a direct-current circuit which is constantly closed during operation of the system and which includes the primary of a transformer, a circuit including the secondary of the transformer, the rails of a block or track section being included in one of said circuits, means comprising a vibratory reed which is extraneous to all circuits of the system for producing direct-current pulsations of a given frequency in the said primary included in the direct-current circuit whereby an alternating current of the same frequency is produced in the other of said circuits, a signal circuit, and a relay for controlling said signal circuit associated with the circuit in which the alternating current is produced, said relay being tuned to the frequency of said alternating current, substantially as described.

10. In an automatic railway block signaling system, a direct-current circuit which is constantly closed during operation of the system and which includes the primary of a transformer, a circuit including the secondary of the transformer, the rails of a block or track section being included in one of said circuits, means comprising a vibratory reed which is extraneous to all circuits of the system for producing current pulsations of a given frequency in the direct-current circuit whereby an alternating current of the same frequency is produced in the other of said circuits, a signal circuit, and a relay for controlling said signal circuit associated with the circuit in which the alternating current is produced and mechanically tuned to the frequency of said alternating current, substantially as described.

11. In an automatic railway block signaling system, a direct-current circuit which is constantly closed during operation of the system and which includes the primary of a transformer, a circuit including the secondary of the transformer, the rails of a block or track section being included in one of said circuits, means comprising a vibratory reed which is extraneous to all circuits of the system for producing current pulsations of a given frequency in the direct-current circuit whereby an alternating current of the same frequency is produced in the other of said circuits, a signal circuit, and a relay for controlling said signal circuit associated with the circuit in which the alternating current is produced and mechanically and electrically tuned to the frequency of said alternating current, substantially as described.

12. In an automatic railway block signaling system, a direct-current circuit which is constantly closed during operation of the system and which includes the primary of a transformer, a circuit including the secondary of the transformer, the rails of a block or track section being included in one of said circuits, means comprising a vibratory reed which is extraneous to all circuits of the system for producing current pulsations of a given frequency in the direct-curernt circuit whereby an alternating current of the same frequency is produced in the other of said circuits, a signal circuit, and a relay for controlling said signal circuit associated with the circuit in which the alternating current is produced and having an armature consisting of a vibratory reed the natural period of vibration of which corresponds to the frequency of said alternating current, substantially as described.

13. In an automatic railway block signaling system, a direct-current circuit which is constantly closed during operation of the system and which includes the primary of a transformer, a circuit including the secondary of the transformer, the rails of a block or track section being included in one of said circuits, means comprising a vibratory reed which is extraneous to all circuits of the system and which is vibrated at its natural period for producing current pulsations of a given frequency in the direct-current circuit whereby an alternating current of the same frequency is produced in the other of said circuits, a signal circuit, and a relay for controlling said signal circuit associated with the circuit in which the alternating current is produced and tuned to the frequency of said alternating current, substantially as described.

14. In an automatic railway block signaling system, a direct-current circuit including the primary of a transformer, and a circuit including the secondary of the transformer, the rails of a block or track section being included in one of said circuits, means comprising a vibratory reed independent of said direct-current circuit and vibrated at its natural period and a microphone in said direct-current circuit, said microphone being in spaced relation to said reed so as not to be engaged by the latter in the vibration thereof, but being positioned so as to be affected by the vibrations of the reed, for producing current pulsations of a given frequency in the direct-current circuit whereby an alternating current of the same frequency is produced in the other of said circuits, a signal circuit, and a relay for controlling said signal circuit associated with the circuit in which the alternating current is produced and tuned to the frequency of said alternating current, substantially as described.

15. In an automatic railway block signaling system, a direct-current circuit, resistance means included in said circuit, the resistance of which is affected by vibration thereof, means comprising a vibratory member which is extraneous to all circuits of the system for vibrating said resistance means to thereby produce current pulsations of a given frequency in said direct-current circuit, a signal circuit, and means for controlling said signal circuit comprising a device normally in operative relation to said direct-current circuit and tuned to the frequency of the current pulsations in the latter, substantially as described.

16. In an eletrical system, a direct-current circuit which is constantly closed during operation of the system, means comprising an electro-magnet in said circuit and vibratory means which is extraneous to all circuits of the system and which is operatively associated with said magnet for producing current pulsations of a given frequency in such circuit, a second circuit, and means for controlling said second circuit comprising a device operatively associated with and tuned to the frequency of the current pulsations produced in said direct-current circuit, substantially as described.

17. In an electrical system, a direct-current circuit, means including vibratory means which is extraneous to all circuits of the system for producing current pulsations of a given frequency in the latter, a second circuit, and means for controlling said second circuit comprising a device operatively associated with and tuned to the frequency of the current pulsations produced in said direct-current circuit, substantially as described.

18. In an electrical system, a direct-current circuit which is constantly closed during operation of the system, means including vibratory means which is extraneous to all circuits of the system for producing current pulsations of a given frequency in said circuit, a second circuit, and means operatively associated with said direct-current circuit and adapted to control said second circuit, substantially as described.

19. In an electrical system, a direct-current circuit which is constantly closed during operation of the system, means including vibratory means which is extraneous to all circuits of the system for producing current pulsations of a given frequency in said circuit, a second circuit, and means for controlling said second circuit comprising a device operatively associated with and tuned to the frequency of the current pulsations produced in said direct-current circuit, substantially as described.

20. In an electrical system, a direct-current circuit which is constantly closed during operation of the system, means including vibratory means which is extraneous to all circuits of the system for producing current pulsations of a given frequency in the direct-current circuit, a second circuit, and means for controlling said second circuit comprising a device operatively associated with and tuned to the frequency of the current pulsations produced in said direct-current circuit, substantially as described.

21. In an electrical system, a direct-current circuit which is constantly closed during operation of the system and which includes the primary of a transformer, a second circuit including the secondary of the transformer, means including vibratory means which is extraneous to all circuits of the system for producing direct-current pulsations of a given frequency in said direct-current circuit whereby an alternating current of the same frequency is produced in the said second circuit, a third circuit, and means operatively associated with said second circuit and adapted to control said third circuit, substantially as described.

22. In an electrical system, a direct-current circuit which is constantly closed during operation of the system and which includes the primary of a transformer, a second circuit including the secondary of the transformer, means including a vibratory reed which is extraneous to all circuits of the system for producing direct-current pulsations of a given frequency in said direct-current circuit whereby an alternating current of the same frequency is produced in the said second circuit, a third circuit, and a relay for controlling said third circuit, said relay being operatively associated with said second circuit and being tuned to the frequency of the alternating current produced therein, substantially as described.

23. In an electrical system, a direct-current circuit including the primary of a transformer, a second circuit including the secondary of the transformer, means including vibratory means which is extraneous to all circuits of the system for producing direct-current pulsations of a given frequency in said direct-current circuit whereby an alternating current of the same frequency is produced in the said second circuit, a third circuit, and means for controlling said third circuit comprising a device operatively associated with and tuned to the frequency of the alternating current produced in said second circuit, substantially as described.

24. In an electrical system, a direct-current circuit including the primary of a transformer, a second circuit including the secondary of the transformer, means comprising a vibratory reed which is extraneous to all circuits of the system vibrated at its natural period for producing current pulsations of a given frequency in the direct-current circuit whereby an alternating current of the same frequency is produced in said second circuit, a third circuit and a relay for controlling said third circuit, said relay being operatively associated with said second circuit and tuned to the frequency of the alternating current produced therein, substantially as described.

25. In an electrical system, a direct-current circuit including the primary of a transformer, a second circuit including the secondary of the transformer, means comprising a tuning fork vibrated at its natural period and a microphone in said direct-current circuit, said microphone being in spaced relation to said tuning fork so as not to be engaged by the latter in the vibration thereof, but being positioned so as to be affected by the vibrations of the tuning fork for producing current pulsations of a given frequency in the direct-current circuit whereby an alternating current of the same frequency is produced in said second circuit, a third circuit, and a relay for controlling said third circuit, said relay being operatively associated with said second circuit and tuned to the frequency of the alternating current produced therein, substantially as described.

26. In an electrical system, a direct-current circuit, means including vibratory means which is extraneous to all circuits of the system for producing current pulsations of a given frequency in the direct-current circuit, a second circuit, and means operatively associated with said direct-current circuit and adapted to control said second circuit, substantially as described.

This specification signed this 9th day of June, 1926.

NEWMAN H. HOLLAND.